United States Patent
Benedetti et al.

(10) Patent No.: US 10,600,521 B2
(45) Date of Patent: Mar. 24, 2020

(54) POWDER-TRANSFER DEVICE WITH IMPROVED FLOW

(71) Applicant: COMMISSARIAT A L'ENERGIE ATOMIQUE ET AUX ENERGIES ALTERNATIVES, Paris (FR)

(72) Inventors: Arnaud Benedetti, Paris (FR);
Philippe Sornay, Manosque (FR);
Meryl Brothier, Aix en Provence (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 185 days.

(21) Appl. No.: 15/529,171

(22) PCT Filed: Nov. 24, 2015

(86) PCT No.: PCT/EP2015/077561
§ 371 (c)(1),
(2) Date: May 24, 2017

(87) PCT Pub. No.: WO2016/083413
PCT Pub. Date: Jun. 2, 2016

(65) Prior Publication Data
US 2017/0358376 A1    Dec. 14, 2017

(30) Foreign Application Priority Data
Nov. 25, 2014    (FR) ..................... 14 61431

(51) Int. Cl.
*G21C 21/02* (2006.01)
*G21C 21/04* (2006.01)
*G21C 3/04* (2006.01)

(52) U.S. Cl.
CPC ............. *G21C 21/04* (2013.01); *G21C 21/02* (2013.01); *G21C 3/045* (2019.01)

(58) Field of Classification Search
CPC .......... G21C 3/045; G21C 21/02; G21C 21/04
See application file for complete search history.

(56) References Cited

U.S. PATENT DOCUMENTS 6,105,887 A    8/2000 Aoki et al.
2005/0261136 A1    11/2005 Rhee et al.
(Continued)

FOREIGN PATENT DOCUMENTS

CN    101027216 A    8/2007
CN    201292163 Y    8/2009
(Continued)

OTHER PUBLICATIONS

International Search Report dated Jan. 26, 2016 in PCT/EP2015/077561 filed Nov. 24, 2015.
(Continued)

*Primary Examiner* — James Sanders
(74) *Attorney, Agent, or Firm* — Oblon, McClelland, Maier & Neustadt, L.L.P.

(57) ABSTRACT

A device for transferring a given powder or a mixture of given powders contained in a container including a side wall and at least one discharge opening, the container with axisymmetric shape having an axis of rotation being arranged in the transfer device such that the discharge opening thereof is located in a lower portion of the container, the transfer device including rotating the container about the axis thereof, on which the discharge opening is located and control for controlling the rotation such that the to rotation imposes on at least one portion of the side wall of the container, referred to as movable portion, a first moving phase wherein an acceleration no lower than a minimum acceleration is capable of causing the powder to slide relative to the movable portion.

15 Claims, 2 Drawing Sheets

(56) References Cited

U.S. PATENT DOCUMENTS

2009/0256271 A1 10/2009 Engelvin et al.
2014/0048172 A1 2/2014 Tomioka et al.

FOREIGN PATENT DOCUMENTS

| CN | 203841929 U | 9/2014 |
|---|---|---|
| FR | 1 507 545 A | 12/1967 |
| FR | 2 796 699 A1 | 1/2001 |
| FR | 2 807 334 A1 | 10/2001 |
| FR | 2 993 195 A1 | 1/2014 |
| JP | H07-61492 | 3/1995 |
| JP | 2009-512843 | 3/2009 |
| JP | 2011-153027 | 8/2011 |

OTHER PUBLICATIONS

French Search Report dated Sep. 17, 2015 in FR 1461431 filed Nov. 25, 2014.
Combined Chinese Office Action and Search Report dated Oct. 22, 2018, in Patent Application No. 201580063742.1 (with partial English translation and English translation of categories of cited documents), 7 pages.
Japanese Office Action with English transiation dispatched on Sep. 24, 2019 in counterpart Japanese Patent Application No. 2017-527305, (6 pages).

POWDER-TRANSFER DEVICE WITH IMPROVED FLOW

TECHNICAL FIELD AND PRIOR ART

This invention relates to a device for transferring powder or mixtures of powder offering improved flow.

In this application, the term "powder" means a granular medium comprised of granular particles having a diameter between 1 nm and several dozen centimeters.

In the nuclear field, the manufacture of nuclear fuel in the form of a pellet with a uranium oxide base or of a mixture of uranium oxide and plutonium intended for nuclear reactors is based on a method of powder metallurgy.

This method comprises three steps: preparing the powder, compacting the powder according to an object of sought shape and consolidating this object by heat treatment.

Until the operation of forming via compaction, the actinide oxide or oxides are in powdery form and are transferred into various hoppers in order to supply the equipment required for the preparation of the granular medium which is compacted. The last piece of equipment with powder is the press mould wherein the powder is compacted.

However, emptying hoppers often gives rise to problems. In certain cases, arches or domes form during the filling of the hoppers or during the emptying thereof which reduce the flow speed by causing it to fluctuate, which even stops or prevents the flow of powders. The forming of theses arches depends on the properties of the powder and in particular on the capacity the powder has to be sheared, on the relationship between the dimension of the particles and the dimension of the discharge opening of the hopper, on the shape of the hopper and on the coefficient of friction between the powder and the walls of the hopper.

In other cases, particles of very small size cake under the effect of electrostatic forces, Van der Waals forces or capillary forces. In the case of a supply hopper, for example of the moulds of a nuclear fuel press, the supply of powder is discontinuous and is interrupted during the compaction of the powder and the ejection of the pellet. The powder must therefore pass from a state wherein it flows to a state wherein it does not flow. However the coefficient of static friction between the hopper and the powder is always higher than the coefficient of dynamic friction, this results in a delay in the flow when the supply is desired. This deferred and fluctuating flow rate is highly penalising for the instantaneous control of the material exiting the container or for the reproducibility of the filling capacity such as press moulds. In particular, this behaviour limits the filling speed and the filling homogeneity of the press moulds and consequently the rates of production and the output.

Technical solutions have been proposed in order to attempt to improve the flow of the powder.

For example, intrusive mechanical systems such as scrapers/"dome-breakers" installed in the powder bed can be used. On the one hand, these mechanical systems may not be sufficient. On the other hand, a certain number of inconveniences results from the use thereof, in particular difficult maintenance and cleaning. Furthermore, mechanical systems can undergo wear and tear by abrasion and cause the powder to become polluted, for example when it entails using powders that are relatively abrasive such as actinide powders. Furthermore, they can alter the agglomerates and significantly change the characteristics of powders. Moreover, certain ducts/hoppers, through their geometry and their dimensions may not make it possible to implement such mechanical systems.

There are however unclogging systems of the pneumatic type that, through insufflation of gas attempt to facilitate the flow. Implementing such systems on dense powders induces reduced levels of effectiveness. Moreover, gas insufflation can sometimes cause a compaction of the granular medium or on the contrary increased risks of potentially penalising dispersion especially for contaminating powders such as those of actinides.

There are also systems that generate vibrations on the wall of the hopper, for example, of the "woodpecker" type or formed by ultrasonic emitters. The waves generated reduce the interaction between the powder and the wall and disturb the stacking of the powder particles. However, if these disturbances lead to breaking the arches, they also modify the stacking which leads to an increase in the compactness which facilitates the forming of arches. If the vibrations are excessively strong, the phenomenon of forming arches due to the increase in the compactness predominates with respect to the phenomenon of decreasing the interaction between the powder and the walls. If the vibrations are excessively weak, they have no effect on the flow of the powder. In general, the operation of the system of the "woodpecker" type is not continuous because it generates excessively strong vibrations resulting in an increase of the compactness. Ultrasound has a weak action on the interaction between the powder and the walls. It is then, most of the time associated with a system or systems of the woodpecker type. However, when operating discontinuously, the system of the "woodpecker" type generates a fluctuation in the emptying flow rate which is as detrimental as the emptied volume is low.

DISCLOSURE OF THE INVENTION

The purpose of this invention is therefore to offer a device for transferring powder offering an improved flow of powder.

The purpose mentioned hereinabove is achieved by a device for transferring powder contained in a container with axisymmetric shape which comprises at least one discharge opening, the discharge opening being in a lower zone of the container in the emptying phase, with the device comprising means for rotating a movable portion of the wall of the container about an axis whereon the discharge opening is, said means able to apply to the movable portion of the wall of the container at least one acceleration of a sufficient value to ensure a continuous sliding of the powder with respect to the wall of the container.

In other words, a relative movement is provided between the powder and at least one portion of the container such that the powder does not adhere to the wall of the container which prevents the appearance of static bearing on which the domes could rest. The flow is then not blocked by the domes. The device provides at least for certain period of time a flow of the powder.

Thanks to the invention, it is possible to obtain a constant emptying flow rate regardless of the volume emptied.

Furthermore, contrary to the application of vibration of the container via a system of the "woodpecker" type, the setting into rotation of the container does not modify the stack of the particles of powder, the compactness of the powder is then not altered which makes it possible to obtain a constant mass flow during the entire flow.

In the case of powders that flow naturally, the means apply an initial acceleration that is sufficient to ensure the sliding of the powder with respect to the container and then maintain the rotation advantageously at a constant rotating speed in order to ensure that the wall of the container is permanently moving with respect to the powder. The powder then flows as soon as the discharge opening is open, the flow of powder occurs without delay and the flow rate is substantially constant during the entire phase of flow.

In the case of powders that do not flow naturally, the sufficient acceleration provides a shear between the particles close to the wall of the container and those farther away from the wall, this shear leads to a dilatancy of the powder which causes the rupture of the arches, the result of this is a flow.

It can be provided that, when the flow is interrupted due to the reforming of domes, the rotation of the container is stopped and another acceleration is applied to the container in order to break the domes again.

Very advantageously, it can be provided that the means for displacing the container in rotation apply a displacement in rotation in one direction and in the other in such a way as to maintain the flow. The means of displacement impose a movement of oscillation of the container around the axis of rotation. Indeed, implementing an oscillating rotating movement makes it possible to suppress the static catching zones between the powder and the wall through variation of the relative speed between the hopper and the granular medium.

This subject-matter of the invention then is a device for transferring a given powder or a mixture of given powders contained in a container, said container comprising a side wall and at least one discharge opening, the container with axisymmetric shape having an axis of rotation that is arranged in the transfer device such that the discharge opening thereof is located in a lower portion of said container, the transfer device comprising means for displacing the container in rotation about its axis of revolution, on which the discharge opening is located, and control means for controlling the means for displacing in rotation such that the means for displacing in rotation impose on at least one portion of the side wall of the container, referred to as movable portion, a first moving phase wherein an acceleration is applied to the movable portion, this acceleration being greater than or equal to a minimum acceleration able to cause the sliding of the powder relative to the movable portion.

Very advantageously, the minimum acceleration is greater than or equal to the product of the coefficient of static friction, of the force exerted by the powder on the side wall of the container and of the radius of the container divided by the moment of inertia of the powder.

In an embodiment, the control means control the means for displacing in rotation such that, during a second phase after the first phase, they maintain the displacement in rotation of the movable portion. Preferably, the control means are such that the means for displacing in rotation displace the movable portion at a constant speed during the second phase.

In another embodiment, the control means are such that the means for displacing in rotation impose on the movable portion a succession of first phases separated by phases at a low or zero speed. Preferably, the control means are such that the means for displacing in rotation impose a displacement of the movable portion such that its direction of rotation is inverted between two successive first phases, in such a way as to impose an oscillating rotating movement. Advantageously, the oscillating rotating movement is periodical. For example, the oscillating rotating movement has a frequency between 5 Hz and 50 Hz.

The transfer device can comprise dynamic means of sealing between the movable portion and fixed portions of the transfer device.

For example, the container is a hopper.

Another subject-matter of the invention is a device for manufacturing nuclear fuel elements comprising a device for transferring powder according to the invention, a press provided with a table wherein at least one mould is formed and means for compressing the powder in the mould, with the emptying end of the container able to be placed facing said mould during a filling phase of the mould and be sealed off outside of a filling phase.

Another subject-matter of the invention is a method for transferring a given powder or a mixture of given powders contained in a container, comprising a side wall and a discharge opening, said discharge opening being arranged in a lower position, with the method comprising at least the step of:

a) setting in rotation a portion at least of the side wall of the container about an axis whereon the discharge opening with an acceleration that is greater than a minimum acceleration causing the sliding of the determined powder with respect to the side wall.

Preferably, the minimum acceleration is greater than or equal to the product of the coefficient of static friction, of the force exerted by the powder on the side wall of the container and of the radius of the container divided by the moment of inertia of the powder.

In an embodiment, the method for transferring comprises a later step b) of maintaining the movement of rotation of the side wall. The movement of rotation is carried out preferably at a constant speed.

In another embodiment, steps a) are repeated successively separated by steps at low or zero speed. The direction of rotation can be inverted between two successive steps a), advantageously periodically.

BRIEF DESCRIPTION OF THE DRAWINGS

This invention shall be understood better based on the following description and on the annexed drawings wherein.

DETAILED DISCLOSURE OF PARTICULAR EMBODIMENTS

According to standard ISO 4490, a powder naturally flows through an orifice if it begins to flow when the opening is opened.

The invention relates to a device for transferring powder. This device can implement a hopper intended to fill recipients or to supply a manufacturing unit using a powder such as for example the moulds for producing nuclear fuel pellets. Alternatively, it can implement a recipient that is sought to be emptied, the latter being removable relative to the device.

Figure 1:
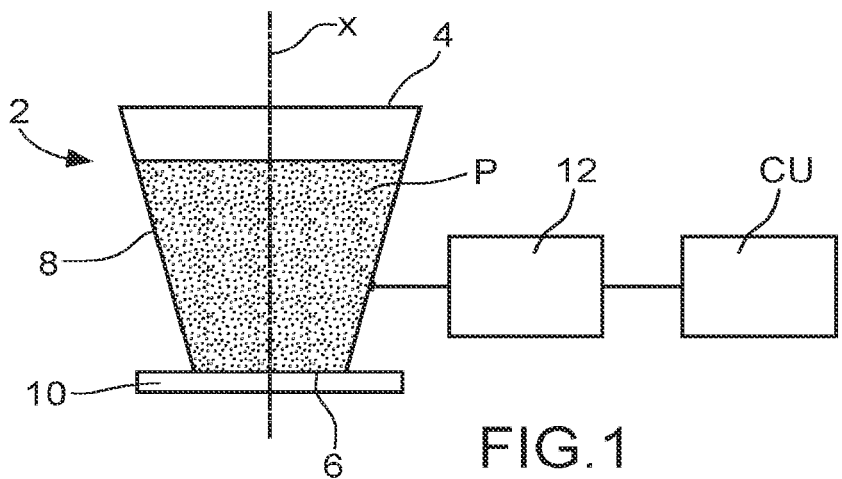
FIG. 1 diagrammatically shows an embodiment of a transfer device according to the invention.

FIG. 1 diagrammatically shows a device for transferring powder according to the invention. In the non-limiting example described the transfer device comprises an axisymmetric hopper 2 comprising an upper end 4 through which it is supplied with powder P and a lower end 6 through which the powder P is removed, and a side wall 8 between the upper end 4 and the lower end 6. The hopper comprises means 10 for temporarily sealing off the lower end 6. The hopper 2 has an axis of revolution X oriented vertically in the representation of FIG. 1.

The entire hopper can be set in rotation.

Alternatively, only an axial portion of the hopper can be set in rotation, in this case it is more preferably an axial portion located on the side of the lower end.

Preferably, means of dynamic sealing (not shown) with powder are provided between the hopper and the other fixed portions or between the movable portion of the hopper and the fixed portion of the hopper.

The device also comprises means 12 for displacing the side wall of the hopper in rotation about its axis X and control means CU of the means 12. In this application, "rotation of the hopper" or more generally "rotation of the container" mean a movement of the hopper or of the container forms of complete revolutions or of a movement of oscillation between two angular positions, with the understanding that the two angular positions can be separated at most by more than 360°.

The means CU control the displacement means 12 such that the acceleration that they apply to the hopper is adjusted to a value greater than or equal to a minimum value $a_{min}$ about the X axis and that they then drive the side wall in rotation according a speed that is constant or not.

The minimum value of acceleration $a_{min}$ is chosen in such a way as to cause a sliding of at least one portion of the powder with respect to the side wall 8. The acceleration is such that it induces a force that is greater than or equal to the forces of static friction between the powder and the side wall.

Figure 2:
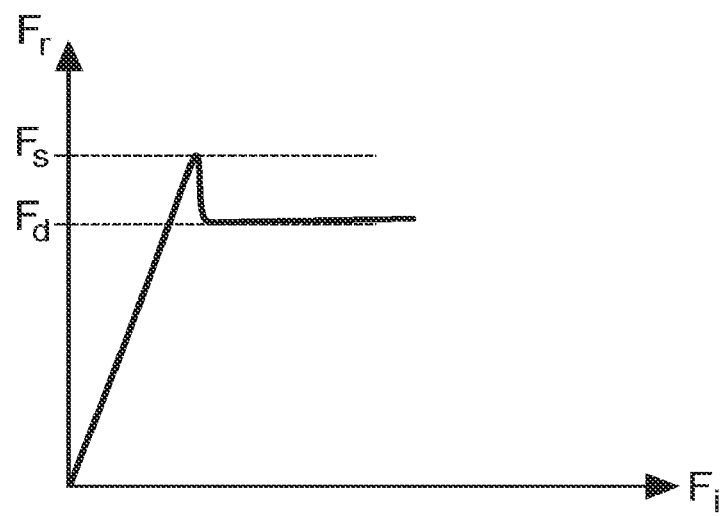
FIG. 2 is a graphical representation of the force of friction between the powder and the wall of a hopper according to the force induced in the powder by the rotation of the wall of the hopper.

In FIG. 2, the force of friction Fs or Fd and the force induced Fi by the rotation of the wall of the hopper can be seen. $F_s$ is the force of static friction and $F_d$ is the force of dynamic friction. It can be seen that beyond a certain value of force induced by the rotation of the wall, the force of friction is only dynamic and is weaker than the force of static friction, with this force not preventing the flow.

Indeed, before the setting into relative movement between the powder and the wall of the hopper, the forces of friction F between the powder and the wall are proportional to the normal component of the reaction (N) of the powder on the surface of the wall. The coefficient of proportionality is the coefficient of apparent powder/wall friction or coefficient of static friction $\mu_s$ which depends on several parameters such as the surface condition and the roughness of the solids in contact.

The maximum value of the friction is given by the coefficient of static friction knowing the normal reaction of the wall on the powder:

$$F_m = \mu_s \times N$$

Generally, the coefficient of dynamic friction that corresponds to the forces of friction induced in the case where the powder and the wall are in relative movement in relation to one another. This coefficient noted as $\mu_d$ is less than the coefficient $\mu_s$ by about 10% to 20% in general.

The coefficient of static friction can be defined as follows:

$\mu_s = \tan \theta_s$ where $\theta_s$ represents the angle with respect to the horizontal starting from which the powder is about to slide on the wall.

The coefficient of dynamic friction can be defined with the same expression but by using $\theta_d$ the angle starting from which the powder slides continuously on the wall.

A powder in a hopper exerts through its weight, a force against the walls of the latter. The minimum acceleration of the hopper is chosen in such a way as to be higher than the product of the coefficient of static friction, of the force exerted by the powder on the wall of the hopper and of the radius of the hopper divided by the moment of inertia of the powder.

For a $UO_2$ powder in cylindrical column with an inner diameter of 10 cm containing a height of powder greater than 15 cm, the relative acceleration must be greater than 1.2 in order to not drive the powder in rotation with the duct. For the same $UO_2$ powder contained in a duct with a diameter of 8 mm less than the diameter of the natural flow of this powder which is 10 mm, the relative acceleration must be greater than 5. It is sought to obtain a displacement between the powder and the side wall that is greater than the size of the particles of powder. For example, if the particles have a diameter of 100 μm, the displacement can be 500 μm.

This minimum acceleration therefore induces a sliding of the powder with respect to the side wall and a flow of the powder.

In an embodiment that is particularly suited to the manipulation of powder that flows naturally, the means of displacing in rotation are controlled such that, after having applied a minimum acceleration $a_{min}$, they impose on the wall of the hopper a permanent rotating speed, preferably constant, and this regardless of the state of sealing of the discharge opening. By maintaining the rotation of the side wall of the hopper, a relative movement is maintained between the powder and the side wall, only the dynamic friction between the powder and the side wall is then to be considered and this whether the discharge opening is open or closed. The sliding between the powder and the side wall is maintained. As such, as long as the sliding is maintained, as soon as the discharge opening is open, the powder flows instantly with a constant flow rate.

Figure 3:
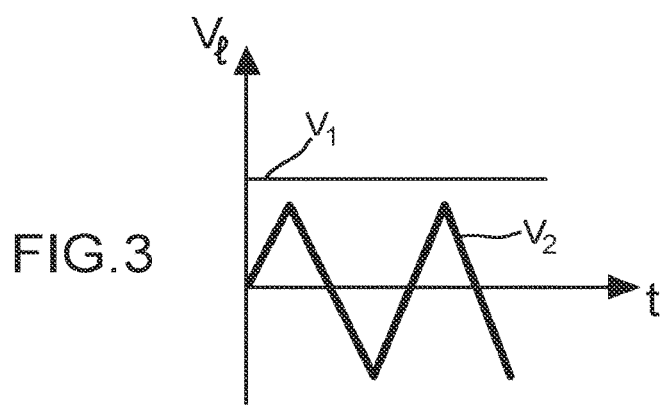
FIG. 3 is a graphical representation of the linear speed of the hopper according to two embodiments.

FIG. 3 shows the linear speed V1 as a function of the time t for two examples of movements that can be imposed on the hopper subassembly.

The speed designated as V1 describes the linear speed in the case of a device suited for powders that flow naturally, the speed V1 is constant. Alternatively, the speed could be variable monotonously or not.

The speed designated as V2 designates the speed in the case of a device suited for powders that do not flow naturally, this method of operation shall be described hereinbelow.

The powder flows when the acceleration is higher than a certain acceleration of the side wall of the hopper. Since the speed of rotation cannot be increased indefinitely, the direction of rotation of the hopper is inverted. The change in the direction of rotation induces a reversal in the direction of shear of the powder close to the surface of the hopper. The coefficient of friction will then decrease to approach zero then will increase again. The flow is then as such facilitated. The acceleration increases then above the minimum acceleration. Preferably, the relative acceleration is greater than 5 for the $UO_2$ powders that do not flow naturally in order to obtain a constant flow rate.

In an embodiment particularly suited to the manipulation of powders that do not flow naturally, the movement of the hopper is intermittent with successive phases of rotation comprising a starting at an acceleration $a_{min}$, a rotation in one direction and a stopping. In FIG. 3, it is possible to see an example of a movement that can be imposed on the hopper, designated by V2, which is the linear speed. The latter has a sawtooth shape and changes sign periodically, illustrating a change in the direction of rotation of the side wall of the hopper. This movement is preferred but is not exclusive of other movements, such as for example non-periodical movements.

Starting at an acceleration $a_{min}$ causes a rupture of the arches that has reformed. A rotation of the hopper after the rupture of the arches maintains the flow as long as the arches have not reformed again.

Very advantageously, the direction of rotation of the side wall is inverted at each phase of rotation. A relative oscillating movement is therefore applied which makes it possible to create sufficient shear between the particles close to the wall and those that are farther away. This shear leads to a dilatancy of the powder that causes the rupture of the arches. This rupture allows the powder to flow.

More particularly, the oscillating rotating movement can be broken down into two phases:

When the arches have been reformed, the powder no longer flows.

The direction of rotation of the hopper is inverted. The forces of friction change direction. However, under the effect of inertia, the powder tends to retain the same direction of rotation. In this phase, the side wall of the hopper and the powder rotate in the opposite direction. The powder slides on the side wall of the hopper and the stresses generated between the particles that slide still with friction on the side wall of the hopper and those farther away lead to an intense local shear of the powder. This shear causes a dilatancy of the powder on the wall which breaks the arches and as such allows for the flow. When the forces of friction become greater than the forces of inertia, the powder is again driven in rotation by the side wall of the hopper. The direction of rotation of the container is then again inverted in order to retain the flow of the powder.

Preferably, the side wall of the hopper has a periodical movement.

The amplitude of the relative displacement of the powder with respect to the side wall of the hopper is according to the acceleration of the side wall of the hopper, of the inertia of the powder and of the friction between the powder and the side wall of the hopper. This relative displacement provokes the forming of shear stress in the powder in the vicinity of the walls which create a dilatancy of the powder, which drives the rupture of the arches which may have formed and prevents the forming of new arches.

The frequency of the oscillating movement is chosen preferably in order to obtain a permanent flow, i.e. the direction of rotation is inverted before the flow is interrupted by the forming of arches.

For example frequencies between 5 Hz and 50 Hz make it possible to have a permanent flow for $UO_2$ powders.

It could however be provided that the direction of rotation be inverted only when the stopping of the flow is detected, in the case of a flow sensor, for example optical, would inform the means of displacement.

In the case of a powder flowing naturally, it can be provided to apply to the hopper an oscillating rotating movement which has for effect to increase the flow rate of the emptying of the powder.

This invention implements a rotating movement that generates on the particles forces that are mostly directed tangentially in relation to the surface of revolution which causes the appearance of an intense shear in a zone close to the wall, contrary to the forces caused by implementing ultrasound or a system of the woodpecker type which are, primarily normal to the surface. In the case of an oscillating rotating movement, the thickness affected by the shear is advantageously much lower than that which is when a system of the woodpecker type is used. This low shear volume has the advantage of not allowing the powder to thicken significantly contrary to what happens under the effect of the vibrations caused by a system of the woodpecker type. Compacting the powder and therefore penalising the flow is thus avoided.

The rotation means 12 can be formed by a motor indexed in position of which the shaft is coaxial to the axis of the hopper and is secured in rotation to the means for suspending the hopper. The means for suspending are then directly engaged with the shaft of the motor. As such a setting into rotation of the shaft causes a displacement in rotation of the hopper. The motor is controlled by the control means in acceleration or in speed and in amplitude of angular displacement in the case of the transfer of powders that do not flow naturally.

The control means are formed for example by a computer comprising the control programs of the motor, the control program is chosen according to the powder or the mixture of powder to be transmitted. The computer can for example be connected to a power source of the motor.

The device for transferring powder can be used to supply for example the press mould or moulds of a device for manufacturing nuclear fuel elements.

Figure 4:
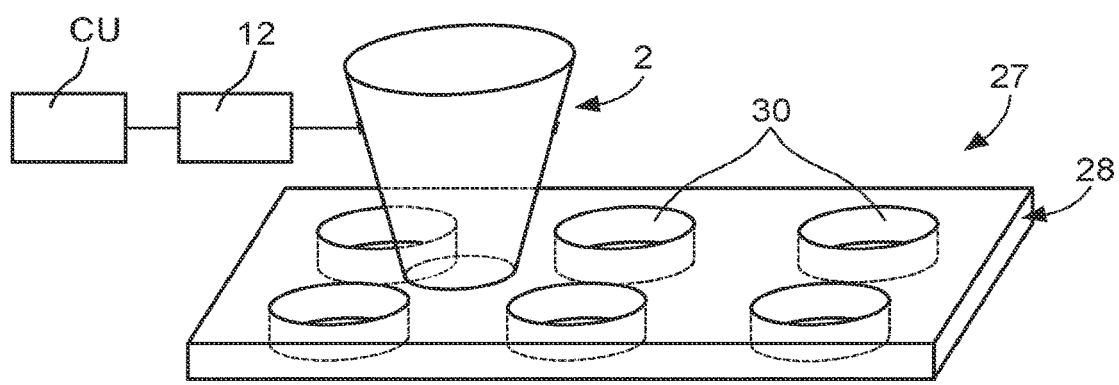
FIG. 4 is a diagrammatical representation of a device for manufacturing nuclear fuel pellets implementing a device for transferring powder according to this invention.

Such a device for manufacturing nuclear fuel elements is shown diagrammatically in FIG. 4. It comprises a press 27 provided with a table 28 wherein at least one mould 30 is carried out, preferably several moulds. In the example shown, the evacuation end of the hopper 2 is open in order to fill the mould 30 and is directly sealed off by the surface of the table during the compaction of the powder and the ejection of the compacted powder. The evacuation end slides on the table 28 and when it is facing the mould, the latter is open. Thanks to the invention, the powder flows instantaneously into the mould 30 at a substantially constant flow rate. The powder is then compacted. As such it is possible to obtain a homogeneous filling of the mould at each step of filling and to obtain pellets of which the characteristics are substantially identical. The delay in the flow that is generally observed during the filling of the dies of the press is suppressed, the speed of the flow is increased and the quantity of material poured into the mould is homogeneous over the entire height of the mould thanks to the mass flow which is constant. The invention makes it possible to increase not only the speed of production by decreasing the filling time but also the quality of the product after compaction since the latter is in part a function of the homogeneity of the material obtained after filling.

The two embodiments apply to the filling of moulds for the manufacture of nuclear fuel pellets.

Preferably, the putting into rotation of the side wall begins prior to a series of fillings of moulds in order to be sure that the powder will flow as soon as the evacuation end is opened.

In the example described, the element containing the powder to be emptied is a hopper, but this could more generally be a container intended to contain powder that is sought to be emptied, with the container intended to be filled while it is in place in the transfer device, such as a hopper or with the container being filled beforehand then set in place in the transfer device and on which the means for displacement 12 apply a relative movement according to the invention.

The device for transferring powder according to the invention is suited for transferring any type of powder in all fields of activity that implement powder.

The invention claimed is:

1. A transfer device for transferring a given powder or a mixture of given powders, the transfer device comprising:
   a hopper configured to contain the given powder or the mixture of given powders, said hopper comprising a side wall and at least one discharge opening, said hopper having an axisymmetric shape and having a substantially vertical axis of revolution, said hopper being arranged such that the at least one discharge opening is located in a lower portion of said hopper; and
   a device configured to displace the hopper in rotation about an axis of revolution thereof, whereon the at least one discharge opening is located, said device including a control unit being configured such that the device configured to displace the hopper in rotation imposes a first moving phase on at least one movable portion of the side wall of the hopper, wherein an acceleration greater than or equal to a minimum acceleration configured to cause the given powder or the mixture of given powders to slide relative to the at least one movable portion is applied to the at least one movable portion,
   wherein the control unit is further configured such that the device configured to displace the hopper in rotation:
      repeats the first moving phase successively, separated by phases at constant speed, and
      periodically inverts a direction of rotation of the at least one movable portion between two successive first moving phases.

2. The transfer device according to claim 1, wherein the minimum acceleration is greater than or equal to a product of a coefficient of static friction, of a force exerted by the given powder or the mixture of given powders on the side wall of the hopper, and of a radius of the hopper divided by a moment of inertia of the given powder or the mixture of given powders.

3. The transfer device according to claim 1, wherein the control unit is further configured such that the device configured to displace the hopper in rotation maintains, during a second phase after the first moving phase, movement in rotation of the at least one movable portion in a given direction of rotation.

4. The transfer device according to claim 3, wherein the control unit is further configured such that the device configured to displace the hopper in rotation displaces the at least one movable portion at a constant speed during the second phase.

5. The transfer device according to claim 1, wherein the periodically inverted direction of rotation between the two successive first moving phases imposes an oscillating rotating movement.

6. The transfer device according to claim 5, wherein the oscillating rotating movement has a frequency between 5 Hz and 50 Hz.

7. The transfer device according to claim 1, further comprising a dynamic sealing element disposed between the at least one movable portion and fixed portions of the transfer device.

8. The transfer device according to claim 1, wherein the hopper is a removable container.

9. A device for manufacturing nuclear fuel elements, comprising the transfer device according to claim 1, a press provided with a table wherein at least one mould is formed, and a device configured to compress the given powder or the mixture of given powders in the mould, with the at least one discharge opening of the hopper configured to be placed facing said mould during a filling phase of the mould and to be sealed off outside of the filling phase.

10. A method for transferring a given powder or a mixture of given powders that implements the transfer device according to claim 1, the method comprising:
   a) setting into rotation the at least one movable portion of the side wall of the hopper about the axis of revolution thereof, whereon the at least one discharge opening is located, with the acceleration greater than the minimum acceleration causing sliding of the given powder or the mixture of given powders with respect to the at least one movable portion of the side wall.

11. The method for transferring according to claim 10, wherein the minimum acceleration is greater than or equal to a product of a coefficient of static friction, of a force exerted by the given powder or the mixture of given powders on the side wall of the hopper, and of a radius of the hopper divided by a moment of inertia of the given powder or the mixture of given powders.

12. The method for transferring according to claim 10, further comprising a later step b) of maintaining a rotation movement of the at least one movable portion of the side wall in a given direction of rotation.

13. The method for transferring according to claim 12, wherein during the step b), the rotation movement is carried out at a constant speed.

14. The method for transferring according to claim 12, wherein step a) is repeated successively, separated by steps at a constant speed.

15. The method for transferring according to claim 14, wherein the given direction of rotation is periodically inverted between two successive steps a).

* * * * *